US009332143B2

(12) United States Patent
Tamai (10) Patent No.: US 9,332,143 B2
(45) Date of Patent: May 3, 2016

(54) IMAGE READING APPARATUS (71) Applicant: SEIKO EPSON CORPORATION, Tokyo (JP)

(72) Inventor: Kensuke Tamai, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 14/795,279

(22) Filed: Jul. 9, 2015

(65) Prior Publication Data

US 2016/0014289 A1  Jan. 14, 2016

(30) Foreign Application Priority Data

Jul. 10, 2014  (JP) ................................. 2014-142060

(51) Int. Cl.
H04N 1/04 (2006.01)
H04N 1/00 (2006.01)

(52) U.S. Cl.
CPC ....... *H04N 1/00549* (2013.01); *H04N 1/00557* (2013.01); *H04N 1/00559* (2013.01)

(58) Field of Classification Search
CPC .............. B65H 85/00; B65H 2801/39; H04N 1/00278; H04N 1/00519; H04N 1/00557; H04N 1/02815; H04N 2201/0081; H04N 5/23238; H04N 1/00591; H04N 1/04; H04N 1/31
USPC ........ 358/498, 474, 496, 486, 1.13, 1.15, 1.9, 358/451, 475, 497, 509; 271/272, 3.14, 271/121, 167, 254, 264, 3.18, 3.19; 382/131, 190, 284; 399/27, 90
See application file for complete search history.

(56) References Cited

U.S. PATENT DOCUMENTS

| 4,367,945 | A | * | 1/1983 | Abe | ..................... | G03B 27/526 355/51 |
|---|---|---|---|---|---|---|
| 5,903,812 | A | * | 5/1999 | Kondoh | ................... | B65H 1/06 271/220 |
| 6,023,347 | A | * | 2/2000 | Hoshino | .............. | H04N 1/0057 358/487 |
| 6,185,403 | B1 | * | 2/2001 | Toyoshima | ............ | B65H 5/062 271/902 |
| 7,909,442 | B2 | * | 3/2011 | Samoto | ................ | B41J 2/17509 347/103 |
| 8,300,279 | B2 | * | 10/2012 | Mukai | .................. | H04N 1/0083 174/350 |
| 8,699,093 | B2 | * | 4/2014 | Takeuchi | ............. | H04N 1/0285 358/474 |
| 8,988,738 | B2 | * | 3/2015 | Nagai | ................ | H04N 1/00557 358/461 |
| 2008/0231913 | A1 | * | 9/2008 | Kurotsu | ................. | H04N 1/028 358/474 |
| 2009/0167825 | A1 | * | 7/2009 | Kawamura | ............... | B41J 2/175 347/85 |
| 2014/0168680 | A1 | * | 6/2014 | Shiomi | ............. | H04N 1/00907 358/1.13 |
| 2015/0314592 | A1 | * | 11/2015 | Tsubotani | ........... | B41J 2/04508 347/17 |

FOREIGN PATENT DOCUMENTS

| JP | 2001-334715 A | 12/2001 |
|---|---|---|
| JP | 2014-017573 A | 1/2014 |

* cited by examiner

*Primary Examiner* — Negussie Worku
(74) *Attorney, Agent, or Firm* — Workman Nydegger (57) ABSTRACT

An image reading apparatus includes an image reading unit that is reciprocally movable in a predetermined direction; a guide member that supports the image reading unit and guides the image reading unit in the predetermined direction; a first cable that is fixed to the image reading unit at one end of the first cable and is deformable in accordance with a movement of the image reading unit; and a second cable that is fixed to the image reading unit at one end of the second cable and is deformable in accordance with the movement of the image reading unit, wherein the first cable and the second cable are provided such that a rotation moment of the image reading unit generated by a reaction force of the first cable and a rotation moment of the image reading unit generated by a reaction force of the second cable cancel each other out.

7 Claims, 13 Drawing Sheets

IMAGE READING APPARATUS

BACKGROUND

1. Technical Field

The present invention relates to an image reading apparatus.

2. Related Art

Image reading apparatuses for reading images of documents, which are placed on document tables made of glass, are known. The image reading apparatuses read the images by moving image reading units provided with image reading sensors under the document tables.

JP-A-2014-17573 discloses an example of such image reading apparatuses.

In JP-A-2014-17573, a contact image sensor unit 13 (hereinafter referred to as "CIS unit 13") as an image reading unit reads an image while moving and being guided by a rail 15. The CIS unit 13 is connected to a processor 17 by a flexible flat cable (hereinafter also referred to as "FFC") 16 which is capable of transmitting image data. The processor 17 records and processes image data.

Here, the FFC 16 connects the image reading unit and the processor 17 and is bent and extended as illustrated in FIGS. 9A and 9B of JP-A-2014-17573. The FFC 16 is disposed in the image reading apparatus so as to be deformable. Therefore, the FFC 16 deforms in accordance with the movement of the image reading unit during image reading.

However, when the FFC 16 is bent and extended in this manner, a reaction force is generated at a bent portion of the FFC 16 and may be applied to the image reading unit. Depending on the position of the image reading unit where the reaction force is applied, the image reading unit may be inclined with respect to the rail 15, so that the image reading unit may not maintain a stable position.

SUMMARY

An advantage of some aspects of the invention is to provide an image reading apparatus which reduces the influence of the cable connected to the image reading unit on the image reading unit as a result of the reaction force, and maintains the image reading unit in a stable position.

An image reading apparatus according to an aspect of the invention includes an image reading unit that is reciprocally movable in a predetermined direction; a guide member that supports the image reading unit and guides the image reading unit in the predetermined direction; a first cable that is fixed to the image reading unit at one end of the first cable and deforms in accordance with a movement of the image reading unit; and a second cable that is fixed to the image reading unit at one end of the second cable and deforms in accordance with the movement of the image reading unit, wherein the first cable and the second cable are provided such that a rotation moment of the image reading unit generated by a reaction force of the first cable and a rotation moment of the image reading unit generated by a reaction force of the second cable cancel each other out.

In the aspect of the invention, one end of the first cable and one end of the second cable are fixed to the image reading unit. The cables apply rotation moments to the image reading unit such that the rotation moments cancel each other out. Accordingly, the image reading unit can maintain a stable position.

In the image reading apparatus, a fixing position in the image reading unit where the first cable is fixed to the image reading unit and a fixing position in the image reading unit where the second cable is fixed to the image reading unit may be opposite each other with respect to the guide member.

The guide member becomes the rotational center of the rotation moments of the image reading unit generated by the reaction forces of the first and second cables.

In this case, the fixing positions of the first and second cables are opposite each other with respect to the guide member as the rotational center. This can easily ensure that the rotation moments, which are generated by the first and second cables, cancel each other out. The image reading apparatus has the same effect as the above-described image reading apparatus.

In the image reading apparatus, rigidity of the first cable may be different from rigidity of the second cable, and in the image reading unit, the fixing position of one of the first cable and the second cable, which has lower rigidity than another one of the first cable and the second cable, may be further from the guide member than the fixing position of the other one of the first cable and the second cable which has higher rigidity than the one of the first cable and the second cable.

Magnitude (F) of the rotation moment is a product (rf) of length (r) and reaction force (f). Herein, the rotation moment is generated by the reaction force applied to the image reading unit by the cable. The length (r) is a distance between the guide member and the fixing position of the cable. The reaction force (f) is applied to the fixing position of the cable. A reaction force applied by a high-rigidity cable is generally larger than that applied by a low-rigidity cable.

In this case, the cable with lower rigidity is fixed at a position further from the guide member than the cable with higher rigidity. Even if the rigidities of the first and second cables are different, the magnitudes of the rotation moments, which are generated by the first and second cables, are balanced. Therefore, the rotation moments generated by the cables can cancel each other out.

In the image reading apparatus, the one of the first cable and the second cable, which has lower rigidity, may supply electric power to a driving source which drives the image reading unit, and the other one of the first cable and the second cable, which has higher rigidity, may transmit image data obtained by reading performed by the image reading unit.

Generally, rigidity of a power supply cable is lower than that of a data transmission cable. Herein, the power supply cable supplies electric power to the driving source which drives the image reading unit. The data transmission cable transmits data acquired by reading performed by the image reading unit.

In this case, the power supply cable with lower rigidity is fixed at a position further from the guide member than the data transmission cable. Therefore, the rotation moments generated by the cables can cancel each other out.

In the image reading apparatus, the fixing position of the first cable and the fixing position of the second cable in the image reading unit may be set according to a position of the guide member.

Except where the guide member is provided at approximately a center of the carriage in a longitudinal direction, the guide member may be biased to one end in the longitudinal direction.

In this case, the cable with lower rigidity is preferably provided at a longer side of the carriage with the guide member as a center. The length of the longer side from the guide member to one end in the longitudinal direction is longer than that of the other side.

Therefore, even if the rigidities of the first and second cables are comparatively considerably different, the cables can be fixed to the image reading unit such that the magnitudes of the rotation moments, which are generated by the first and second cables, are balanced.

In the image reading apparatus, the image reading unit may include a reading sensor for reading an image and a carriage which holds the reading sensor and is guided by the guide member, and the first cable and the second cable may be fixed to the carriage.

In this case, the image reading apparatus has the image reading unit including the reading sensor and the carriage and can ensure the same effect as any one of the above-described effects.

BRIEF DESCRIPTION OF THE DRAWINGS

The invention will be described with reference to the accompanying drawings, wherein like numbers reference like elements.

DESCRIPTION OF EXEMPLARY EMBODIMENTS

A scanner, which is an example of an image reading apparatus according to an exemplary embodiment of the invention, will be described below with reference to the accompanying drawings. The invention is not limited to the following embodiment.

First Embodiment

Figure 1:
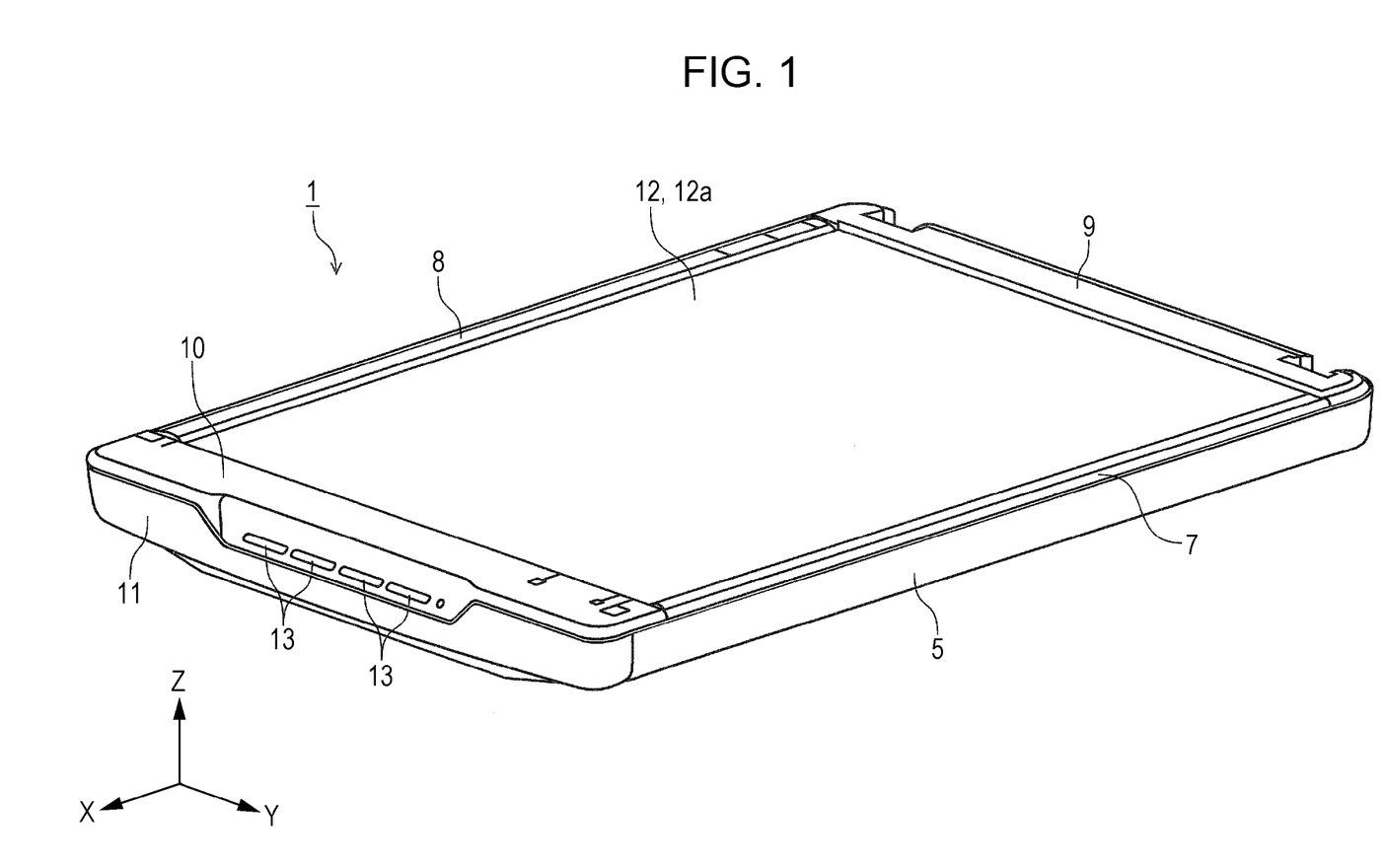
FIG. 1 is a perspective view illustrating an appearance of a scanner according to an embodiment of the invention.
Figure 2:
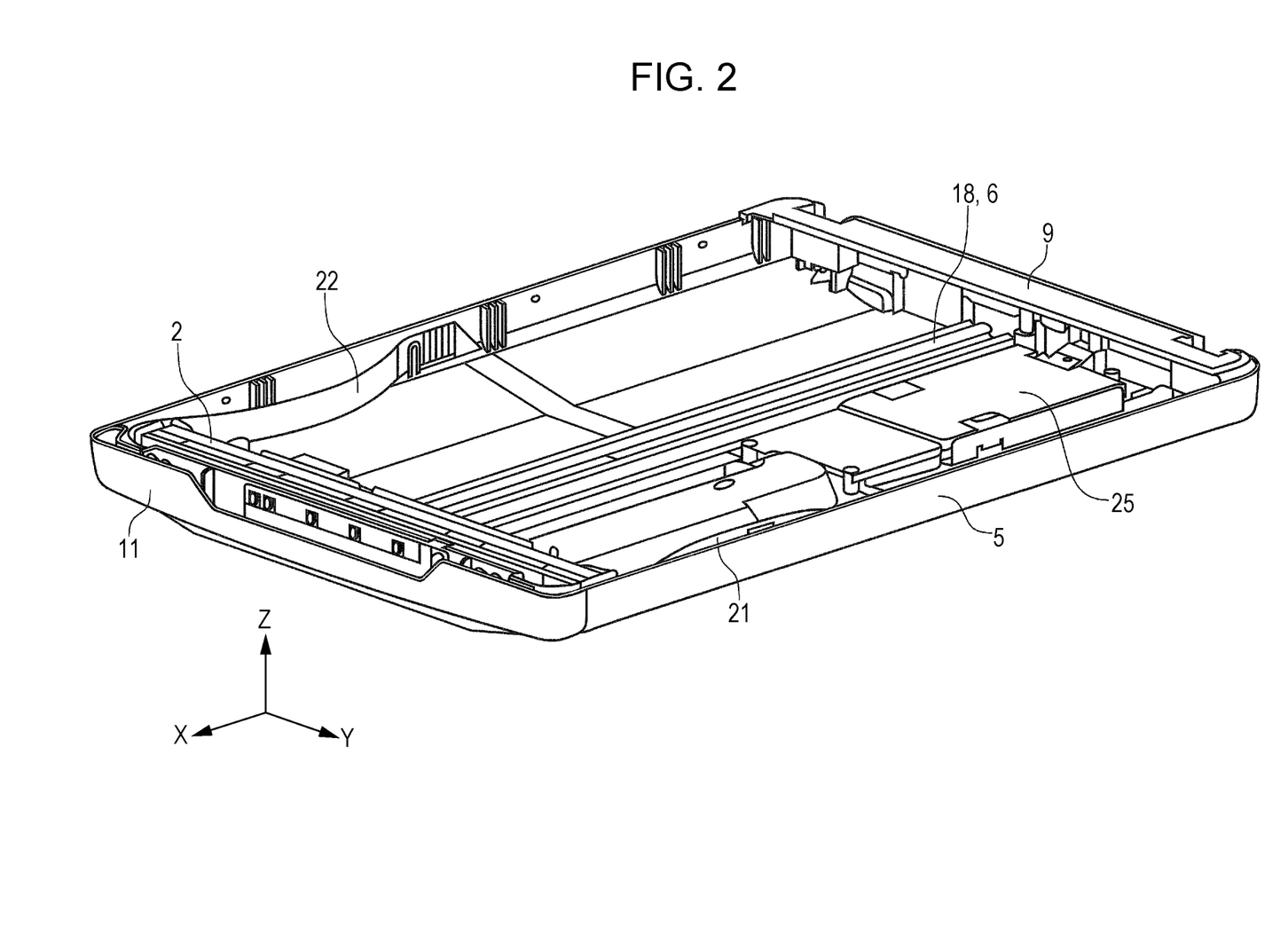
FIG. 2 is a perspective view illustrating an inside of the scanner according to the embodiment of the invention.
Figure 3:
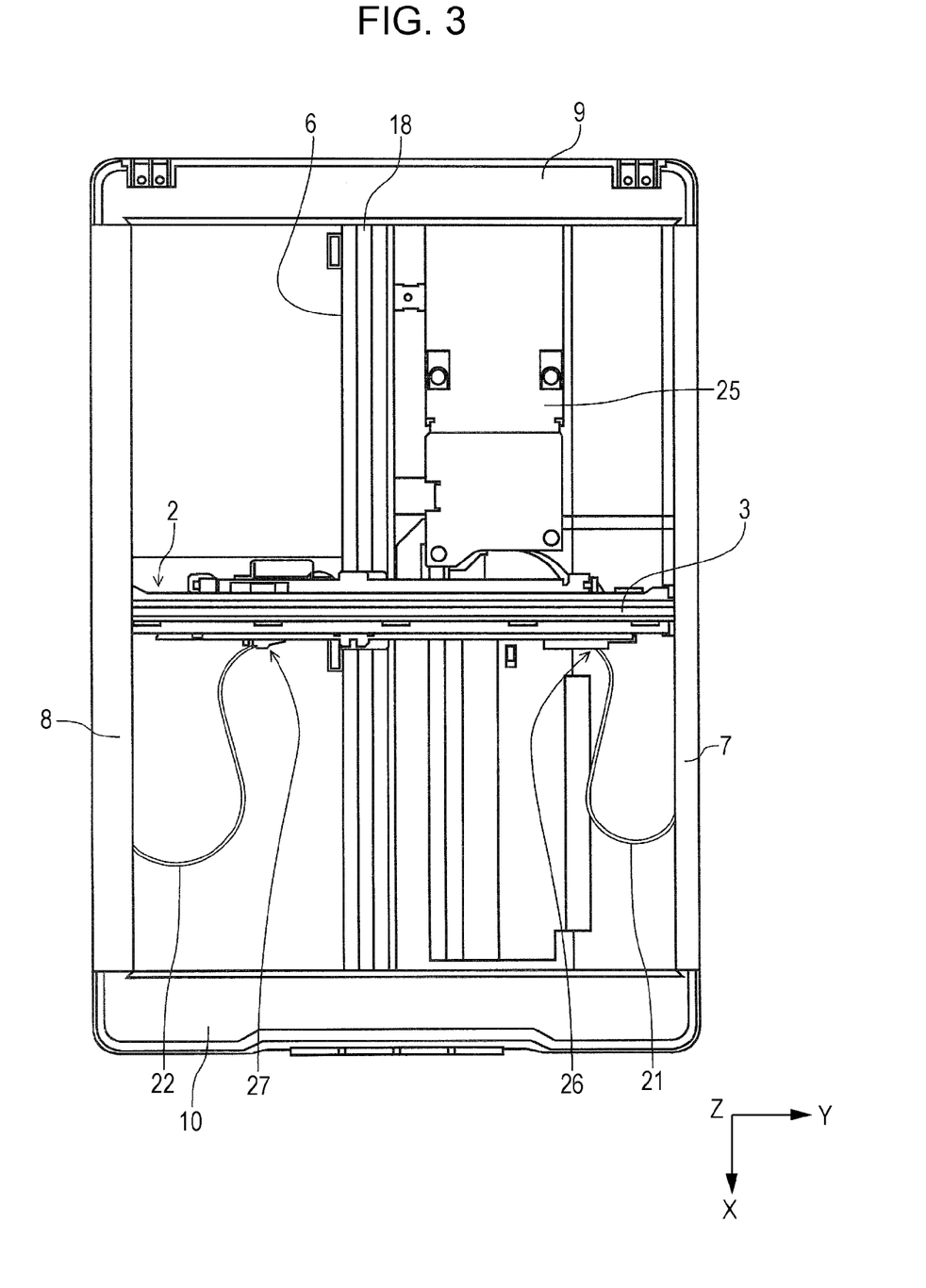
FIG. 3 is a plan view illustrating the inside of the scanner according to the embodiment of the invention.
Figure 4A:
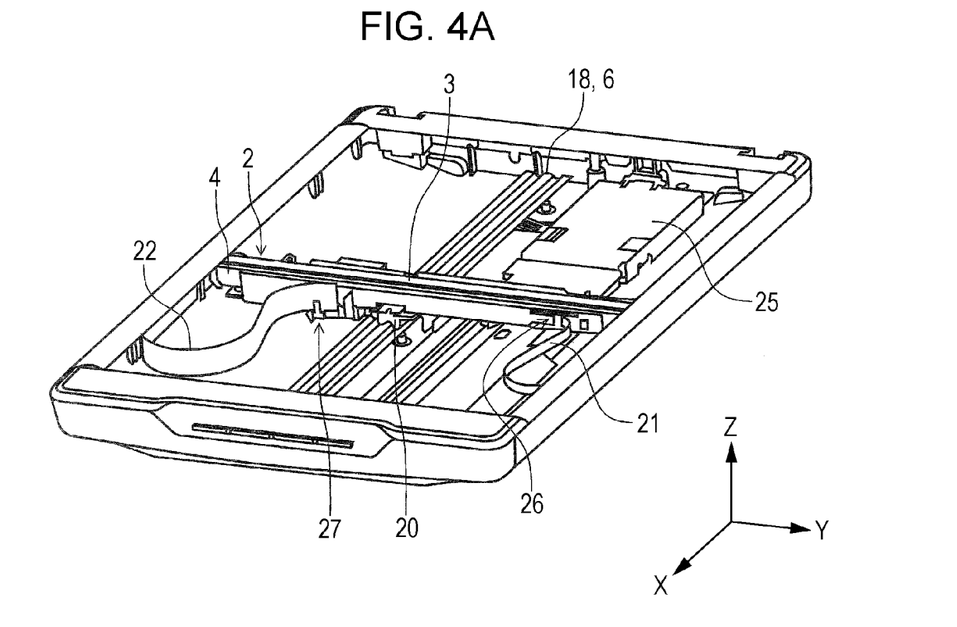
FIG. 4A is a perspective view illustrating the scanner according to the embodiment of the invention in a moved state of an image reading unit.
Figure 4B:
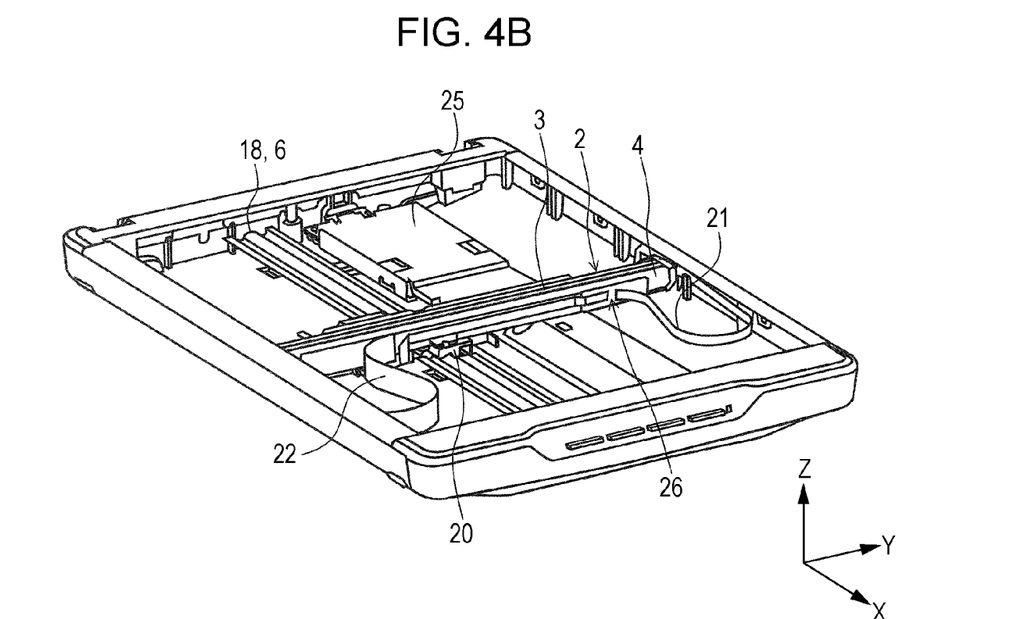
FIG. 4B is a perspective view illustrating the scanner in FIG. 4A when viewed in a direction different from that of FIG. 4A.
Figure 5:
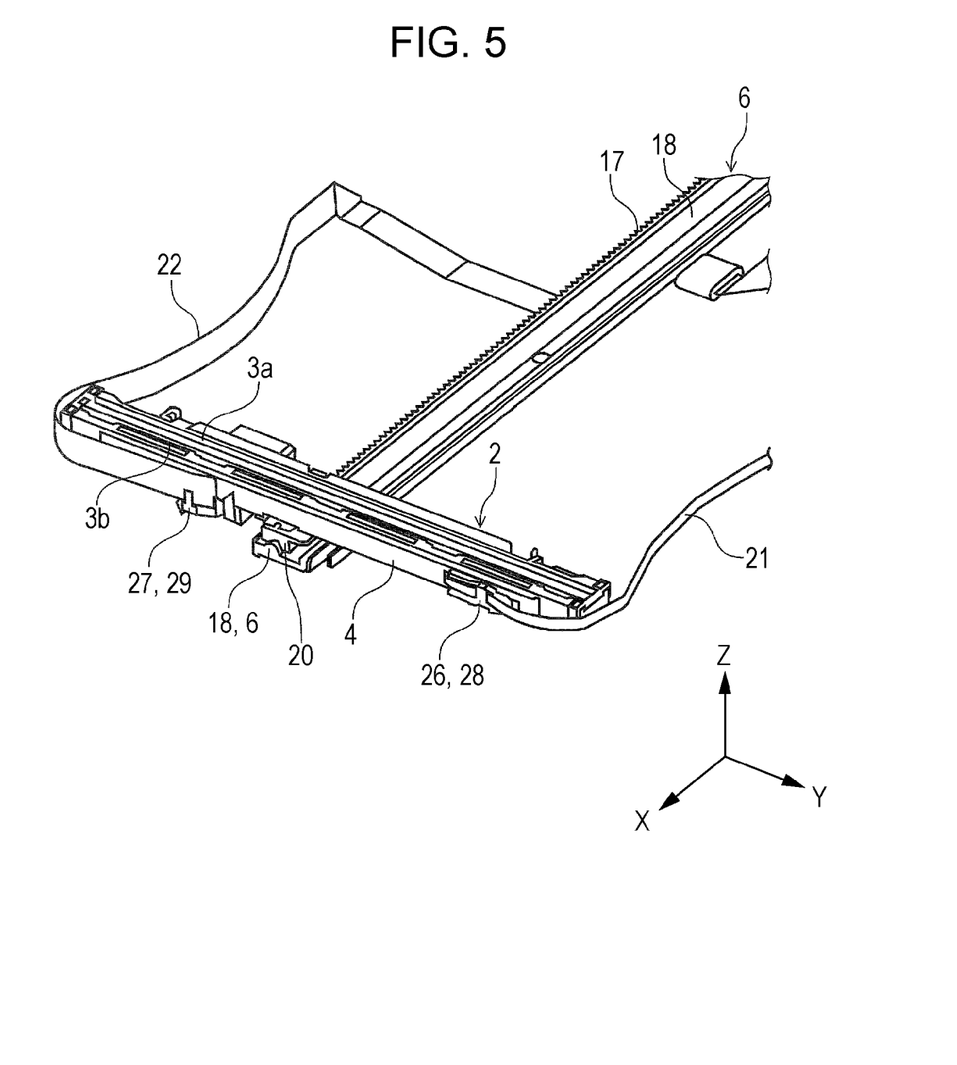
FIG. 5 is a perspective view illustrating the image reading unit and a guide member.
Figure 6:
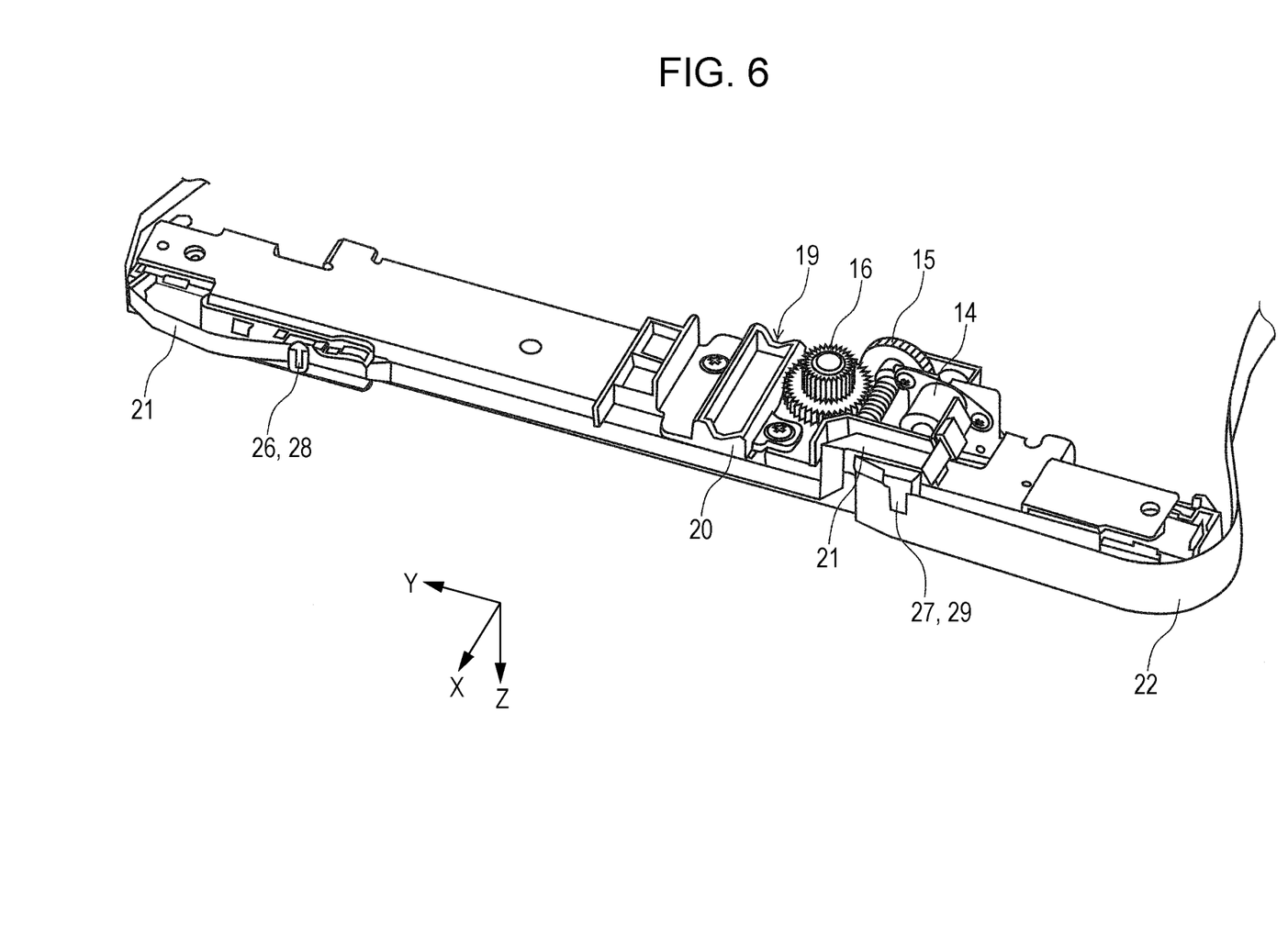
FIG. 6 is a perspective view illustrating a rear surface of the image reading unit.
Figure 7:
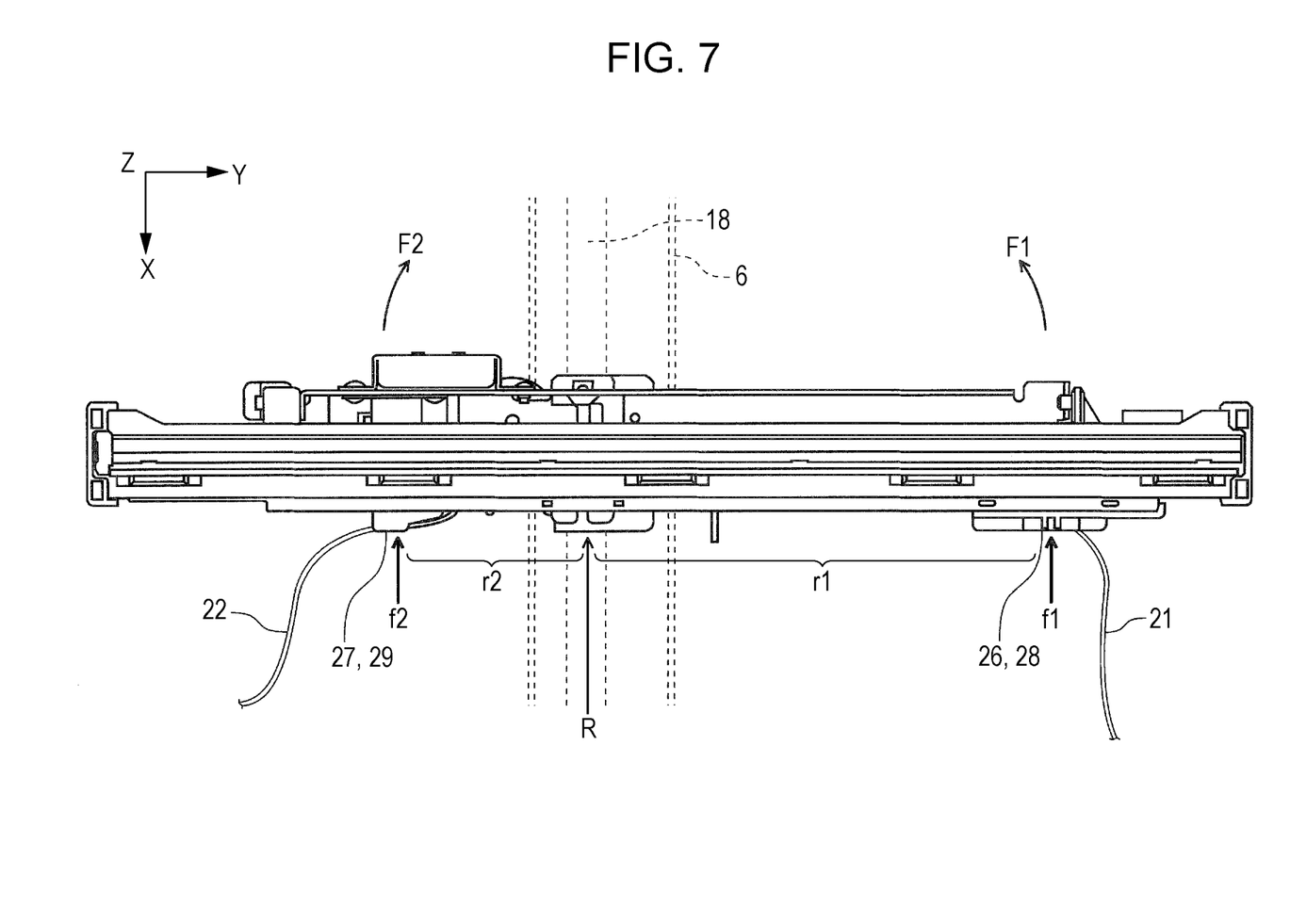
FIG. 7 is a plan view illustrating the image reading unit.
Figure 8:
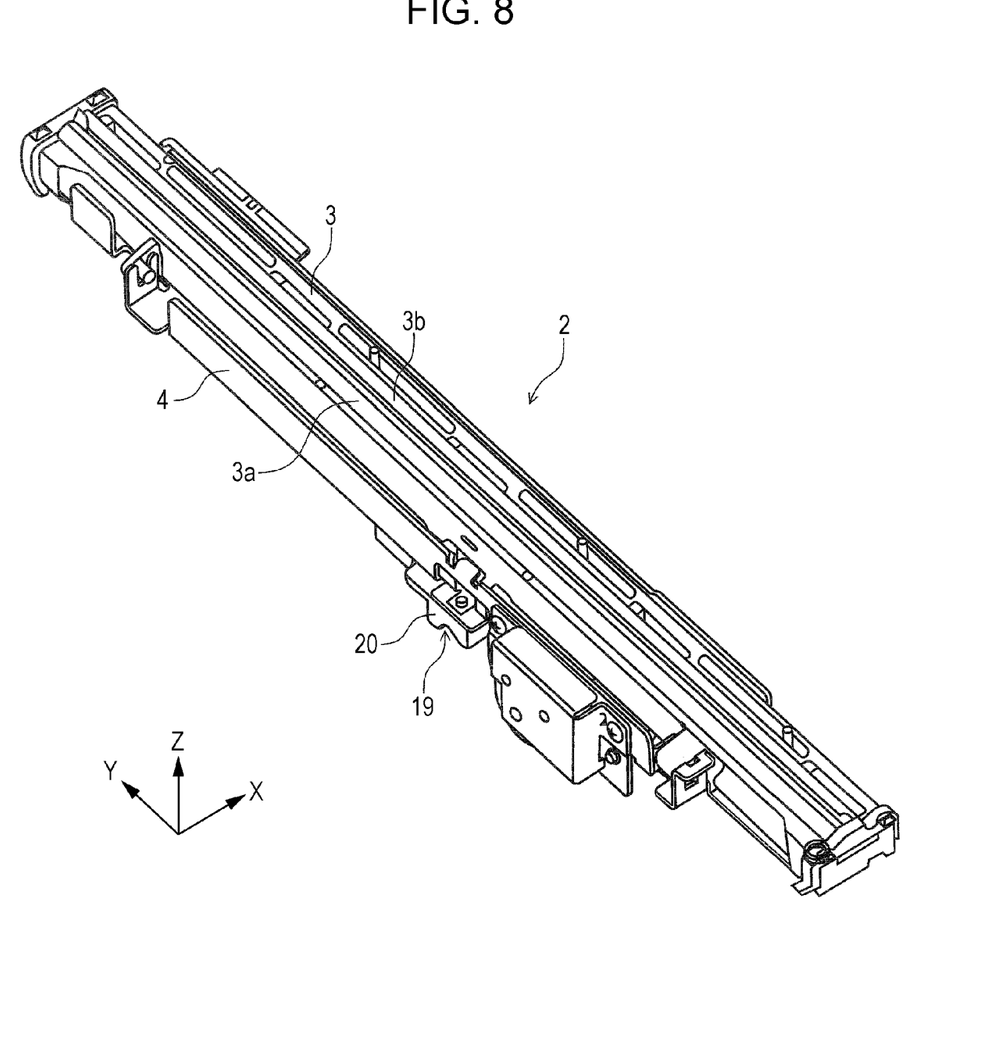
FIG. 8 is a perspective view illustrating the image reading unit.
Figure 9:
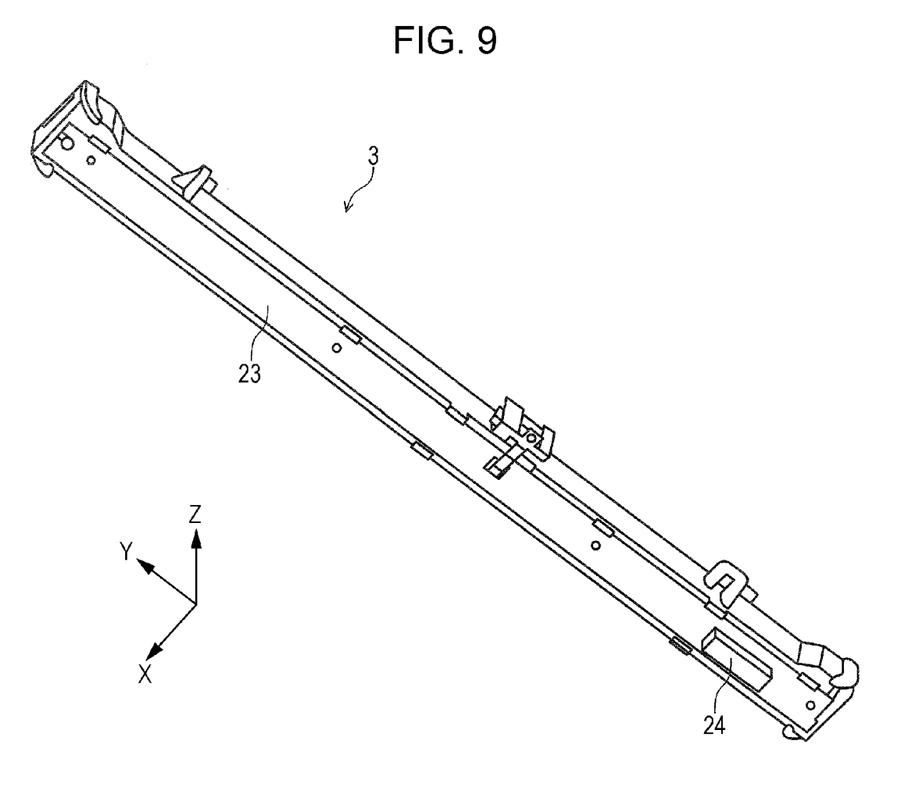
FIG. 9 is a perspective view illustrating a rear surface of a reading sensor.
Figure 10:
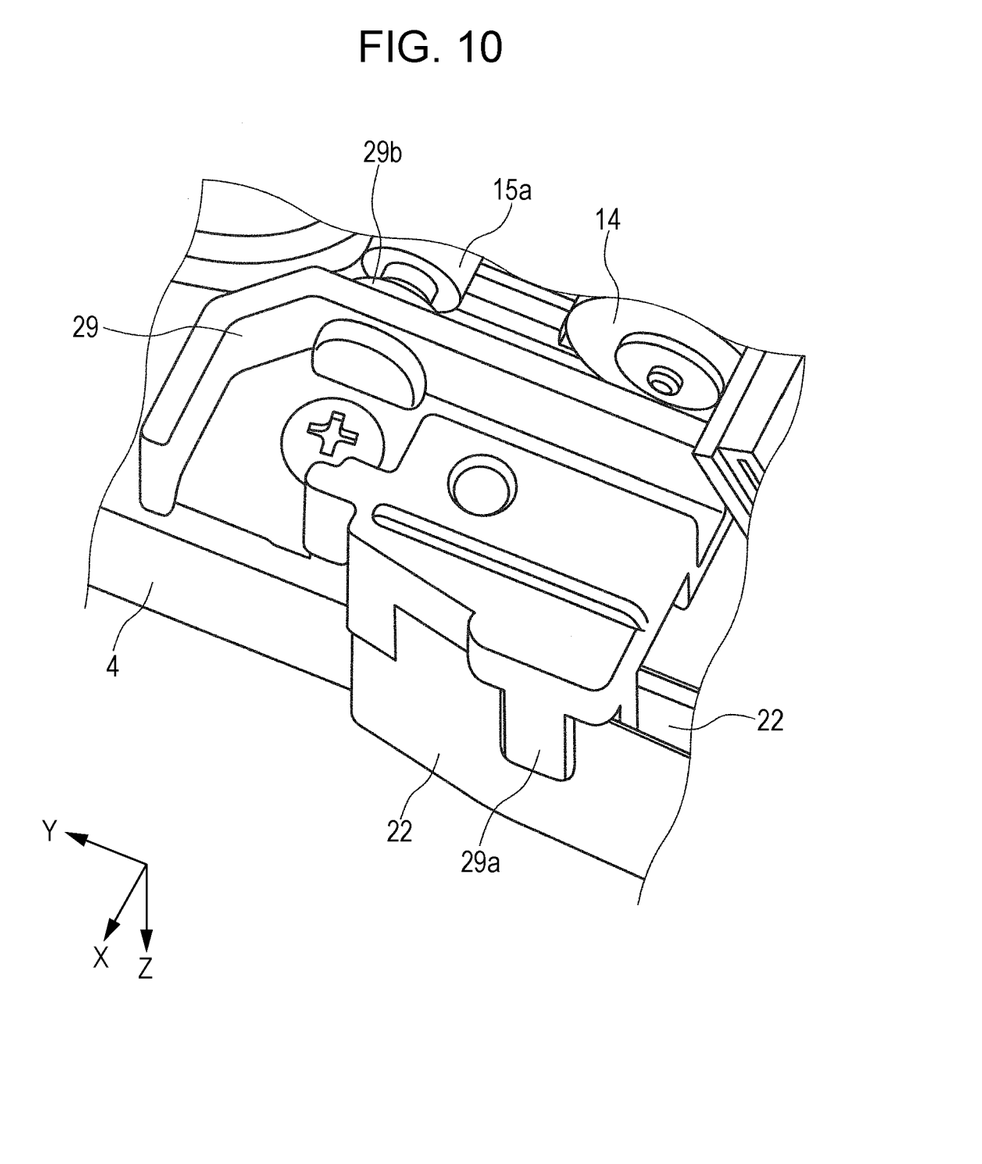
FIG. 10 is a perspective view illustrating a holding structure holding an FFC in a carriage.

FIG. 1 is a perspective view illustrating an appearance of a scanner according to an embodiment of the invention. FIG. 2 is a perspective view illustrating an inside of the scanner according to the embodiment of the invention. FIG. 3 is a plan view illustrating the inside of the scanner according to the embodiment of the invention. FIG. 4A is a perspective view illustrating the scanner according to the embodiment of the invention in a moved state of an image reading unit. FIG. 4B is a perspective view illustrating the scanner in FIG. 4A when viewed in a direction different from that of FIG. 4A. FIG. 5 is a perspective view illustrating the image reading unit and a guide member. FIG. 6 is a perspective view illustrating a rear surface of the image reading unit. FIG. 7 is a plan view illustrating the image reading unit. FIG. 8 is a perspective view illustrating the image reading unit. FIG. 9 is a perspective view illustrating a rear surface of a reading sensor. FIG. 10 is a perspective view illustrating a holding structure holding an FFC in a carriage.

In the X-Y-Z coordinate system in the drawings, X and Y directions are horizontal directions. The X direction is a scanning direction of the image reading unit and a depth direction of the image reading apparatus. The Y direction is the direction in which the image reading unit extends and a width direction of the image reading apparatus. A Z direction is a gravity direction and a height direction of the image reading apparatus. In the drawings, a +Z direction is a direction toward an upper surface side of the image reading apparatus, and a −Z direction is a direction toward a rear surface side of the image reading apparatus.

The scanner 1 according to an exemplary embodiment of the invention will be described below with reference to the accompanying drawings.

As illustrated in FIG. 1, the scanner 1 has a document glass table 12. An upper surface of the document glass table 12 serves as a document placing surface 12a where a document is placed. In this embodiment, the document glass table 12 is a transparent glass plate. The document glass table 12 includes plural frames. These frames demarcate a rectangular area. The rectangular area is a document reading area (document placing surface 12a) where the image reading unit 2 (see FIG. 2) reads an image of a document.

The scanner 1 has an openable/closable cover (not shown). The cover opens and closes to provide access to the document placing surface 12a. The cover is provided with a document pressing mat (not shown) which is formed of an elastic material such as a sponge. When the cover is closed, the document placed on the document placing surface 12a is pressed by the document pressing mat, and a surface to be read of the document is in close contact with the document placing surface 12a.

The frames, which demarcate the document placing surface 12a, specifically include a right upper frame 7, a left upper frame 8, a rear frame 9, and an upper front frame 10. These frames 7 to 10 are attached to a housing 5. A bottom front frame 11 is attached to the housing 5 under the upper front frame 10. An operation button 13 is a button for operating the scanner 1. In this embodiment, the frames 7 to 11 and the housing 5 are all made of a resin material.

The housing 5 is formed into a box-shape. As illustrated in FIG. 2, housing 5 is provided with the image reading unit 2. That is, in this embodiment, the scanner 1 is a flatbed type scanner. The image reading unit 2 is arranged under the document glass table 12, and is relatively movable with respect to the document glass table 12. In this embodiment, the image reading unit 2 moves in an X-axis direction.

The image reading unit 2 includes a reading sensor 3 and a carriage 4 holding the reading sensor 3 (see FIGS. 4A to 9). The reading sensor 3 is held in a state where the reading sensor 3 is urged in a +X direction by an urging member (not shown). The urging member is attached to the carriage 4.

The reading sensor 3 has a light source 3a and a light receiving section 3b (see FIGS. 5 and 8). The reading sensor 3 is an optical sensor. The reading sensor 3 illuminates light from light source 3a onto the document placed on the document placing surface 12a, receives light reflected from the document by a light receiving section 3b, and reads an image of the document. A charge coupled device (CCD) or a contact image sensor (CIS) may be used as the optical sensor.

The carriage 4 is engaged with the guide member 6 and is movable with respect to the guide member 6. The carriage 4 has a motor 14 (see FIG. 6) as a driving source for moving the carriage 4. The carriage 4 is made to move in the X-axis direction by the motor 14 while being guided by the guide member 6.

More specifically, the carriage 4 is made to slide in the X-axis direction by a rack and pinion mechanism while being guided by the guide member 6. The rack and pinion mechanism will be described in detail below.

As illustrated in FIG. 5, a rack 17 is extended in the X-axis direction on the guide member 6. The rack 17 engages the pinion 16 (see FIG. 6) in the carriage 4. The motor 14 rotates the pinion 16.

Further, a projecting portion 18 of the guide member 6 is engaged with an engaging member 20 of the carriage 4.

As illustrated in FIG. 6, the carriage 4 has the motor 14 at a rear surface side (−Z direction side) thereof. A driving force is transmitted from the motor 14 to a pinion 16 by a worm gear 15, and rotates the worm gear 15.

Further, the carriage 4 is provided with an engaging member 20. A recessed section 19 of the engaging member 20 is slidably engaged with the projecting portion 18 of the guide member 6.

In a state where the pinion 16 of the carriage 4 is engaged with the rack 17 of the guide member 6, the pinion 16 is rotated by the motor 14 while being in contact with the rack 17. Therefore, the carriage 4 moves in the X-axis direction while being guided by the guide member 6 (projecting portion 18).

The carriage 4 has the motor 14 at the rear surface side thereof. The carriage 4 is connected to one end of a first cable 21. The first cable 21 is a flexible flat cable (hereinafter also referred to as "FFC") and supplies electric power to the motor 14. The other end of the first cable 21 is connected to an electric power supply source (not shown). The first cable 21 connected to the motor 14 is extended from the rear surface side of the carriage 4 and is fixed at a predetermined position of the carriage 4, for example, a position 26 of a +X direction side wall surface of the carriage 4 in this embodiment. Then, the first cable 21 is extended in the housing 5. As illustrated in FIG. 3, the first cable 21 has a bent portion. Therefore, the first cable 21 is deformable in accordance with a movement of the carriage 4 (the image reading unit 2).

The first cable 21 is held by a holding member 28 (see FIG. 5) and fixed to the carriage 4 at the position 26.

The reading sensor 3 held in the carriage 4 is provided with a board 23 (see FIG. 9) at a rear surface side (−Z direction side) thereof. The board 23 converts the image of the document, which is read by the light receiving section 3b, into an electrical signal. The board 23 is provided with a connecting portion 24 which is connected to a second cable (FFC) 22. The second cable 22 transmits the electrical signal, which is converted from read image data by the board 23, to a controller 25 (see FIGS. 4A and 4B). The second cable 22 is extended from the rear surface side of the reading sensor 3 and is fixed to the +X direction side wall surface of the carriage 4. The second cable 22 is fixed to the carriage 4 at a fixing position 27. As illustrated in FIG. 3, the second cable 22 has a bent portion in the same way as the first cable 21. Therefore, the second cable 22 is deformable in accordance with the movement of the carriage 4 (the image reading unit 2).

The second cable 22 is held by a holding member 29 (see FIG. 5) at a position 27 and is fixed to the carriage 4. As illustrated in FIG. 10, the holding member 29 fixes the second cable 22 by a holding portion 29a and is integrally provided with a bearing 29b. The bearing 29b supports a shaft 15a of a worm gear 15 configuring a driving mechanism for the carriage 4. The holding member 29 can be formed of, for example, a resin material.

The first cable 21 is held by the holding member 28, is extended toward the +Y side from a fixing position 26, and is curved in an S-shape in plan view. The second cable 22 is held by the holding member 29, is extended toward the −Y side, and is curved in an inverted S-shape in plan view. That is, the first and second cables 21 and 22 are extended in curved shapes symmetrical with respect to the X-axis.

Here, in a case where FFCs (for example, the first cable 21 and the second cable 22) are connected to the carriage 4 and are deformable in accordance with the movement of the carriage 4 in the image reading apparatus, the FFCs are generally bent and extended in the housing 5 as illustrated in FIG. 3. Therefore, reaction forces are applied to the fixing positions of the FFCs in the carriage 4 which is engaged with the guide member 6. The reaction forces generate rotation moments around the guide member 6 in the carriage 4.

In the present invention, the image reading apparatus 1 has two cables, that is, the first cable 21 and the second cable 22 which are fixed to the carriage 4 (the image reading unit 2). The present invention is characterized in that the first cable 21 and the second cable 22 are fixed such that the rotation moments thereof, which are generated by the reaction forces of the first and second cables 21 and 22 on the carriage 4, cancel each other out.

More specifically, in this embodiment, as illustrated in FIG. 3, the fixing position 26 of the first cable 21 and the fixing position 27 of the second cable 22 are opposite each other with respect to the guide member 6 and are on the same surface side with respect to the carriage 4 moving in the X direction.

As described above, the guide member 6 is the rotational center R (see FIG. 7) of the rotation moments which are generated by the reaction forces received by the carriage 4 from the first and second cables 21 and 22.

That is, the fixing position 26 of the first cable 21 and the fixing position 27 of the second cable 22 are opposite each other with respect to the guide member 6 as the rotational center R.

As shown in FIG. 7, a reaction force f1 is applied to the fixing position 26 of the first cable 21. A reaction force f2 is applied to the fixing position 27 of the second cable 22. The reaction forces f1 and f2 are applied in the same direction (−X direction) and are applied to positions opposite each other with respect to the rotational center R (the guide member 6). Accordingly, rotation moments F1 and F2 cancel each other out. The rotation moment F1 is generated around the guide member 6 by the reaction force f1. The rotation moment F2 is generated around the guide member 6 by the reaction force f2.

Here, the first and second cables 21 and 22 may have different rigidities. A reaction force generated by a high-rigidity cable is generally larger than that generated by a low-rigidity cable.

Magnitude (F) of the rotation moment is a product (rf) of length (r) and reaction force (f). Herein, the rotation moment is generated by the reaction force (f). The reaction force (f) is applied to the carriage 4 by the cable connected to the carriage 4. The length (r) is a distance between the guide member 6 as the rotational center and the fixing position of the cable. The reaction force (f) is applied to the fixing position of the cable.

Note that, the length (r) between the guide member 6 and the fixing position of the cable is a length in Y-axis direction.

Therefore, in the carriage 4, the cable with lower rigidity is fixed at a position further from the guide member 6 than the cable with higher rigidity. The magnitudes of the rotation moments, which are generated by two cables with different rigidities, are balanced. Accordingly, the rotation moments generated by the cables can cancel each other out.

In this embodiment, rigidity of the first cable 21 (a power supply cable for supplying electric power to the motor 14) is lower than that of the second cable 22 (a cable for transmitting image data).

Therefore, in the carriage 4, the fixing position 26 of the first cable 21 with lower rigidity is further from the guide member 6 than the fixing position 27 of the second cable 22 with higher rigidity. A length r1 is a distance between the guide member 6 as the rotational center R and the fixing position 26 of the first cable 21. A length r2 is a distance between the guide member 6 as the rotational center R and the fixing position 27 of the second cable 22.

Note that, in a case where rigidities of two cables are the same, fixing positions of two cables may be spaced apart by the same length with respect to the rotational center R.

In this embodiment, the guide member 6 is approximately at the center of the carriage 4 in the longitudinal direction (Y-axis direction). The fixing positions 26 and 27 of the first and second cables 21 and 22 in the carriage 4 are preferably set on the basis of a position of the guide member 6.

For example, the guide member 6 may be biased to one end of the carriage 4 in the longitudinal direction. In this case, the cable with lower rigidity is preferably provided at a longer side of the carriage 4 with the guide member 6 as a center. The length of the longer side from the guide member to one end in the longitudinal direction is longer than that of the other side. That is, the cable with lower rigidity is preferably provided at a side which can be made longer than the other side.

Therefore, even if the rigidities of the first and second cables are comparatively considerably different, the cables can be fixed to the image reading unit so that the magnitudes of the rotation moments, which are generated by the first and second cables, are balanced.

The above-described embodiment ensures the following effects.

That is, two cables, which are the first cable 21 and the second cable 22, are fixed to the carriage 4 configuring the image reading unit 2 so that the rotation moments cancel each other out. The rotation moments are applied to the image reading unit 2 (carriage 4) from the two cables at the positions 26 and 27 where the cables are fixed. Accordingly, the image reading unit 2 can maintain a stable position.

In addition, the fixing positions 26 and 27 of the first and second cables 21 and 22 are opposite each other with respect to the guide member 6 as the rotational center R of the rotation moments. This can easily ensure that the rotation moments, which are generated by the first and second cables 21 and 22, cancel each other out.

In addition, in this embodiment, the rigidity of the first cable 21 is lower than that of the second cable 22. Therefore, the first cable 21 is fixed at a position further from the guide member 6 than the second cable 22. This can ensure that the rotation moments, which are generated by two cables with different rigidities, cancel each other out.

Note that, in this embodiment, as mentioned above, the fixing positions 26 and 27 of the first and second cables 21 and 22 are opposite each other with respect to the guide member 6 in the carriage 4 configuring the image reading unit 2. However, other arrangements of the fixing positions 26 and 27 are possible. For example, the two cables 21 and 22 may be connected to both sides (+X direction side and −X direction side) of a side wall of the carriage 4 that holds the reading sensor 3 in the X-axis direction.

In addition, in this embodiment, as mentioned above, the first cable 21 and the second cable 22 are fixed to the carriage 4. However, the fixing positions of the cables are not limited to positions of the carriage 4. The present invention is applicable to a case where each cable applies a reaction force thereof to the image reading unit 2 and a rotation moment is generated around the guide member 6. For example, rotation moments may be generated by reaction forces of cables at connecting portions of the cables.

Other Configurations of Image Reading Apparatus According to The Present Invention As described above with reference to FIG. 5, the engaging member 20 is provided at the back side (−Z side) of the carriage 4 and slides in the X-axis direction while being engaged with the guide member 6. Accordingly, the image reading unit 2 moves while being guided by the guide member 6.

Figure 11A:
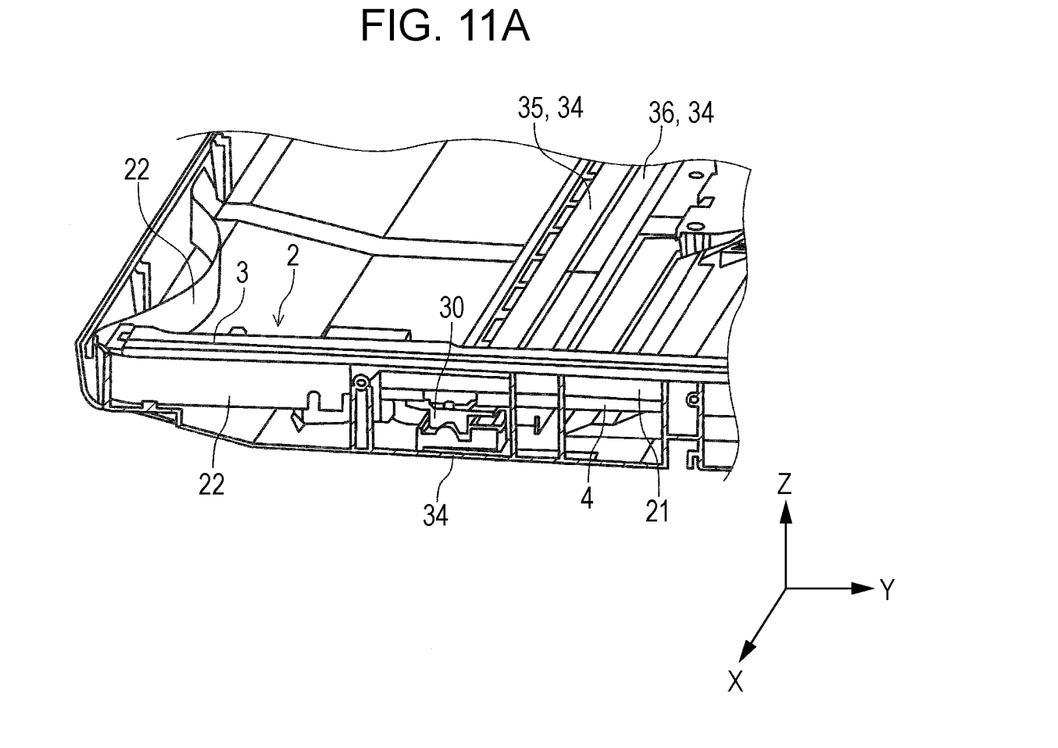
FIG. 11A is a perspective view illustrating the image reading unit engaging with a guide member.
Figure 11B:
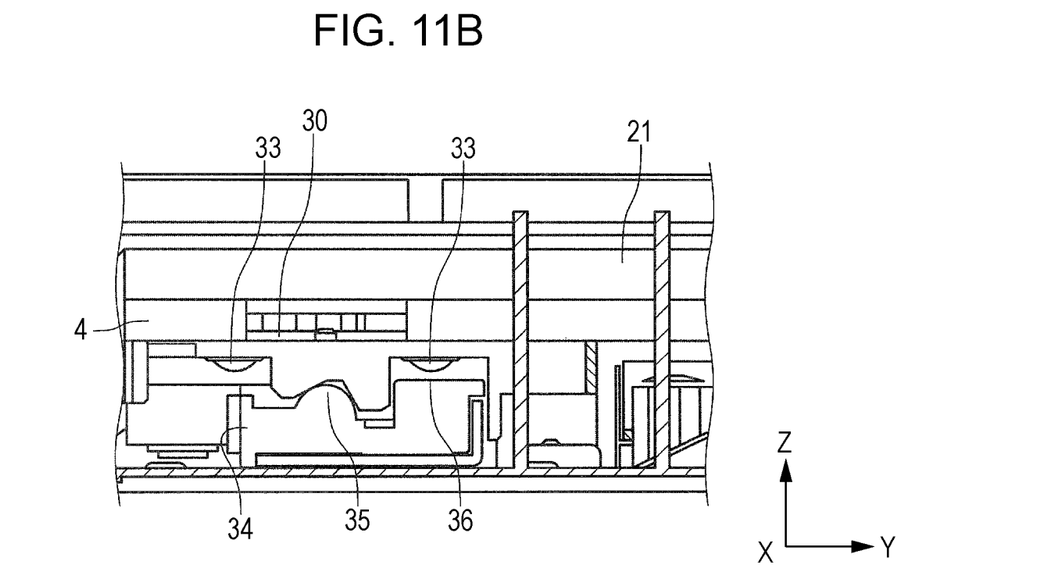
FIG. 11B is an enlarged front view illustrating an engaging portion engaging the guide member with the image reading unit.
Figure 12A:
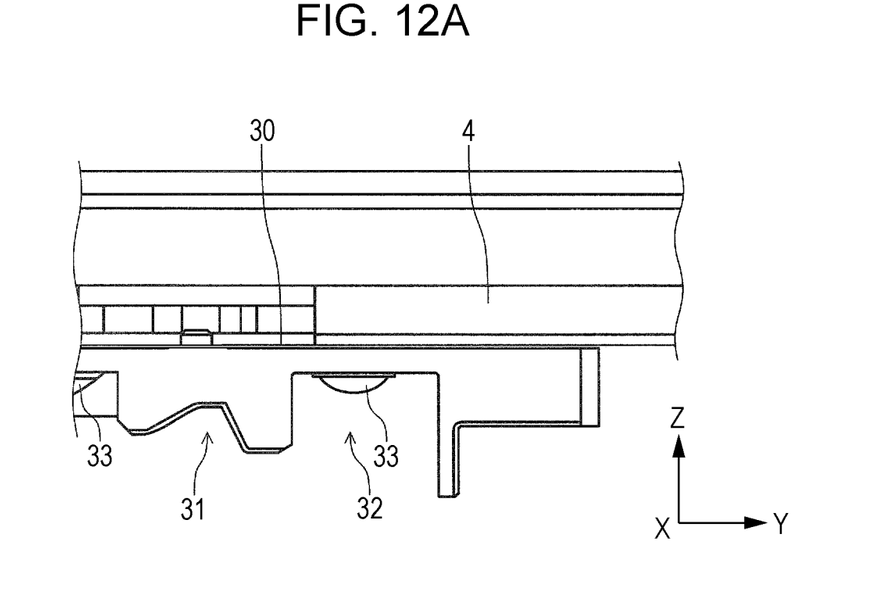
FIG. 12A is a front view illustrating the engaging member.
Figure 12B:
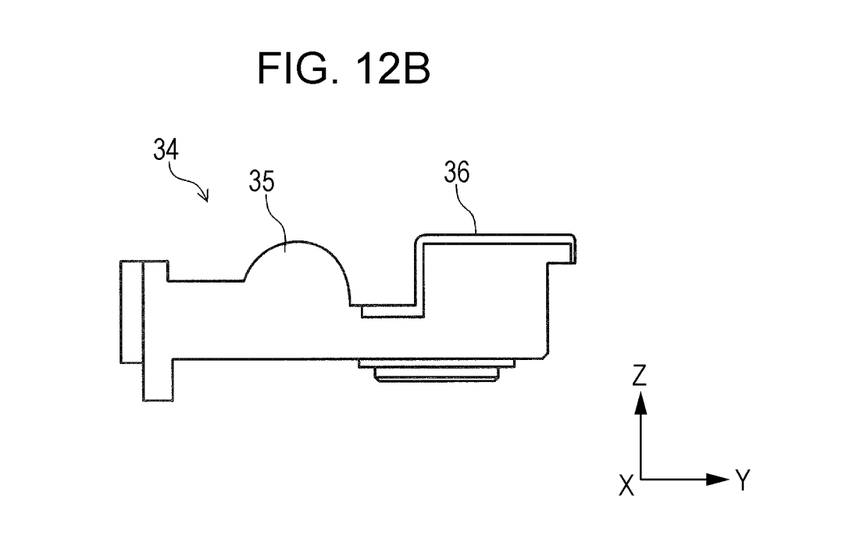
FIG. 12B is a front view illustrating the guide member.

Another example of the engaging member 20 and the guide member 6 will be described below. FIG. 11A is a perspective view illustrating the image reading unit engaging with the guide member. FIG. 11B is an enlarged front view illustrating an engaging portion engaging the guide member with the image reading unit. FIG. 12A is a front view illustrating the engaging member. FIG. 12B is a front view illustrating the guide member.

Note that, the same reference numerals are given to portions repeated in the description of the first embodiment, and description thereof will be omitted.

As illustrated in FIG. 11A, the image reading unit 2 is provided with an engaging member 30 on the back side (−Z side) of the carriage 4. A guide member 34 is engaged with the engaging member 30 and guides the image reading unit 2 in the X-axis direction. The engaging member 30 is provided on the back side of the carriage 4 by a screw 33 (see FIG. 11B).

As illustrated in FIG. 12A, the engaging member 30 has two recessed sections, which are a first recessed section 31 and a second recessed section 32. As illustrated in FIG. 12B, the guide member 34 has two projecting portions (a first projecting portion 35 and a second projecting portion 36). As illustrated in FIG. 11B, the first recessed section 31 is engaged and in slidable contact with the first projecting portion 35 and is slidable in the X-axis direction. The second recessed section 32 is engaged with the second projecting portion 36.

Here, for example, if the scanner 1 is inclined or dropped when carried, the image reading unit 2 may disengage from the guide member 34. In this case, the image reading unit 2 according to the first embodiment is supported by the guide member 6 through only engagement of the projecting portion 18 and the recessed section 19 and is thus easily disengaged from the guide member 6.

The engaging member 30 and the guide member 34 according to this embodiment have two engaging portions formed with the first recessed section 31 and the first projecting portion 35, and formed with the second recessed section 32 and the second projecting portion 36. Therefore, the possibility of the image reading unit 2 disengaging from the guide member 34 can be suppressed.

Note that, it is preferable that the second recessed section 32 and the second projecting portion 36 not be in contact with each other in a normal state (use state). However, they may be in contact with each other such that there is no interference with stable sliding movement of the first recessed section 31.

Figure 13:
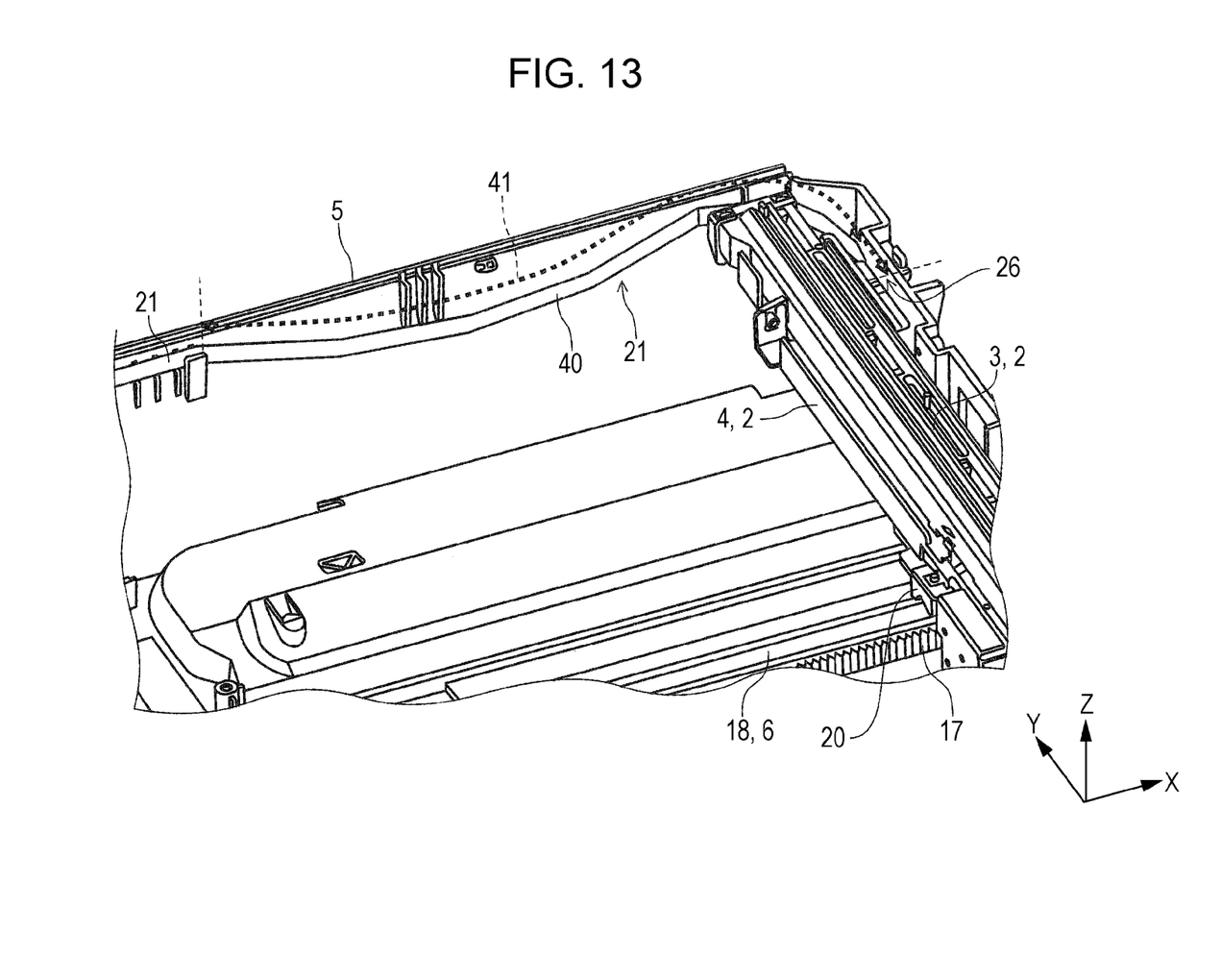
FIG. 13 is a perspective view illustrating the inside of the scanner.

Next, another configuration of the image reading apparatus according to the present invention will be described with reference to FIG. 13. FIG. 13 is a perspective view illustrating the inside of the scanner.

The first cable 21 and the second cable 22 are deformable in accordance with the movement of the image reading unit 2. In a case where the image reading unit 2 is positioned at an end of +X side (a state in FIG. 13), the first and second cables 21 and 22 are provided such that a flat surface of the FFC is along a side wall (no reference numeral) of the housing 5 which extends in the X-axis direction.

Here, if the rigidity of the first cable 21 is particularly low, the first cable 21 tends to hang down, for example, in a range shown by an arrow 41 in FIG. 13. Therefore, the first cable 21 may be loose in the −Z direction.

In a case where the first cable 21 is loose, when image reading unit 2 moves in the −X direction from the +X side end (position of the image reading unit 2 in FIG. 13), the first cable 21 may become caught under the image reading unit 2. If the image reading unit 2 catches the first cable 21, the image reading unit 2 will become stuck.

To avoid this, a reinforcing member 40 may be provided to the first cable 21 around the range shown by the arrow 41. The reinforcing member 40 may be made of a material with sufficient rigidity to prevent the reinforcing member 40 from being loose in the −Z direction and that allows the reinforcing member 40 to deform in accordance with the movement of the image reading unit 2 when the reinforcing member 40 is formed so as to have approximately the same width as that of the first cable 21 and is provided to the first cable 21.

Further, for example, an adhesive or a double-sided adhesive tape may be used for providing the first cable 21 with the reinforcing member 40. Note that, if an adhesive, a double-sided adhesive tape, or the like is used for an entire surface of the first cable 21, rigidity of the whole first cable 21 may become too high. Therefore, several adhesives, several double-sided adhesive tapes, or the like are preferably used at intervals in the range shown by the arrow 41.

Note that, in a case where the reinforcing member 40 is provided, the fixing position 26 of the first cable 21 is set on the basis of rigidity of the first cable 21 in a situation where the reinforcing member 40 is provided.

Note that the invention is not limited to the embodiments described above and may be modified in various ways within the scope of the claims. It goes without saying that the modifications are also included in the scope of the invention.

The entire discovery of Japanese Patent Application No.: 2014-142060, filed Jul. 10, 2014 is expressly incorporated by reference herein.

What is claimed is:

1. An image reading apparatus comprising:
   an image reading unit that is reciprocally movable in a predetermined direction;
   a guide member that supports the image reading unit and guides the image reading unit in the predetermined direction;
   a first cable that is fixed to the image reading unit at one end of the first cable and is deformable in accordance with a movement of the image reading unit; and
   a second cable that is fixed to the image reading unit at one end of the second cable and is deformable in accordance with the movement of the image reading unit,
   wherein the first cable and the second cable are provided such that a rotation moment of the image reading unit generated by a reaction force of the first cable and a rotation moment of the image reading unit generated by a reaction force of the second cable cancel each other out.

2. The image reading apparatus according to claim 1,
   wherein a fixing position in the image reading unit where the first cable is fixed to the image reading unit and a fixing position in the image reading unit where the second cable is fixed to the image reading unit are opposite each other with respect to the guide member.

3. The image reading apparatus according to claim 2,
   wherein rigidity of the first cable is different from rigidity of the second cable, and
   wherein in the image reading unit, the fixing position of one of the first cable and the second cable, which has lower rigidity than another one of the first cable and the second cable, is further from the guide member than the fixing position of the other one of the first cable and the second cable which has higher rigidity than the one of the first cable and the second cable.

4. The image reading apparatus according to claim 3,
   wherein the one of the first cable and the second cable, which has lower rigidity, supplies electric power to a driving source which drives the image reading unit, and
   wherein the other one of the first cable and the second cable, which has higher rigidity, transmits image data obtained by reading performed by the image reading unit.

5. The image reading apparatus according to claim 4,
   wherein the fixing position of the first cable and the fixing position of the second cable in the image reading unit are set according to a position of the guide member.

6. The image reading apparatus according to claim 5,
   wherein the image reading unit includes a reading sensor for reading an image, and a carriage which holds the reading sensor and is guided by the guide member, and the first cable and the second cable are fixed to the carriage.

7. The image reading apparatus according to claim 6, further comprising:
   an engaging portion that engages the guide member with the carriage; and
   a connecting portion that connects one end of each of the first cable and the second cable to the carriage,
   wherein the connecting portion is disposed toward the fixing position of the second cable with respect to the guide member,
   wherein the one end of the first cable is connected to the connecting portion via one surface of the carriage in a scanning direction of the carriage, and
   wherein a width of the first cable is smaller than a width of the second cable such that the first cable does not overlap the engaging portion.

* * * * *